US007751614B2

(12) United States Patent
Funakura et al.

(10) Patent No.: US 7,751,614 B2
(45) Date of Patent: Jul. 6, 2010

(54) ALBUM CREATING APPARATUS, ALBUM CREATING METHOD, AND ALBUM CREATING PROGRAM

(75) Inventors: Hiroyuki Funakura, Kanagawa (JP); Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1076 days.

(21) Appl. No.: 11/434,125

(22) Filed: May 16, 2006

(65) Prior Publication Data

US 2006/0268120 A1    Nov. 30, 2006

(30) Foreign Application Priority Data

May 16, 2005    (JP)    ............... 2005-142975

(51) Int. Cl.
    *G06K 9/00*    (2006.01)
(52) U.S. Cl. .................................... 382/162
(58) Field of Classification Search ................. None
    See application file for complete search history.

(56) References Cited

U.S. PATENT DOCUMENTS

| 6,778,759 | B1 * | 8/2004 | Yamada et al. ............... 386/95 |
| 6,859,546 | B2 * | 2/2005 | Matsukawa et al. .......... 382/103 |
| 7,218,776 | B2 * | 5/2007 | Sowinski et al. ............ 382/162 |
| 7,251,357 | B2 * | 7/2007 | Takemoto ................... 382/162 |
| 2002/0140981 | A1 * | 10/2002 | Takemoto ................... 358/1.18 |
| 2005/0156942 | A1 * | 7/2005 | Jones ....................... 345/589 |

FOREIGN PATENT DOCUMENTS

| JP | 2002-49924  A | 2/2002 |
| JP | 2002-51206  A | 2/2002 |
| JP | 2002-300363 A | 10/2002 |

OTHER PUBLICATIONS

English Translation of the detail description of the JPO patent document 2002-49924 cited by the applicant.*
English Translation of the detail description of the JPO patent document 2002-51206 cited by the applicant.*
JP Communication, dated Feb. 16, 2010, issued in corresponding JP Application No. 2006-113595, 1 page in Japanese.

* cited by examiner

*Primary Examiner*—Yuzhen Ge
(74) *Attorney, Agent, or Firm*—Sughrue Mion, PLLC

(57) ABSTRACT

A color scheme suitable for a captured position is performed on a portion except a captured image based on position information of the captured image. The album creating apparatus according to the present invention includes a captured position specifying section that specifies a captured position at which a captured image constituting an album is taken, an image storing section that stores a captured images in association with a captured position, an image classifying section that classifies a plurality of captured images stored on the image storing section into captured image groups based on the captured position, a color selecting section that selects a color to be used in a portion except the captured image in the album based on the captured position specified by the captured position specifying section, a color adding section that uses the color selected by the color selecting section to add color to the portion except the captured image in the album, and an image arranging section.

9 Claims, 12 Drawing Sheets

| IMAGE IDENTIFIER | CAPTURED POSITION | | IMAGE DATA |
|---|---|---|---|
| 3000 | NORTH LATITUDE | ○○ DEGREES ○○ MINUTES | □ |
|  | EAST LONGITUDE | △△ DEGREES △△ MINUTES | |
| 3100 | NORTH LATITUDE | ×× DEGREES ×× MINUTES | □ |
|  | EAST LONGITUDE | □□ DEGREES □□ MINUTES | |
| 3200 | SOUTH LATITUDE | ☆☆ DEGREES ☆☆ MINUTES | □ |
|  | WEST LONGITUDE | ▽▽ DEGREES ▽▽ MINUTES | |
| ... | ... | ... | ... |

| THE NAME OF A COUNTRY | COLOR PALETTE INFORMATION |
|---|---|
| CHINA | COLOR A, COLOR B, COLOR C |
| ENGLAND | COLOR D, COLOR E, COLOR F |
| ⋮ | ⋮ |

| POSITION (LATITUDE, LONGITUDE) | TYPE OF PLACE | TEXTURE INFORMATION |
|---|---|---|
| (30° 16' N, 130° 25' E) ⟨ (30° 22' N, 130° 37' E) | FOREST | TEXTURE A |
| (35° 26' N, 140° 22' E) ⟨ (35° 33' N, 140° 27' E) | SANDY BEACH | TEXTURE D |
| (35° 14' N, 139° 8' E) ⟨ (35° 15' N, 139° 9' E) | CASTLE TOWN | TEXTURE E |
| ⋮ | ⋮ | ⋮ |

| POSITION (LATITUDE, LONGITUDE) | TYPE OF PLACE | THE TIME | TEXTURE INFORMATION | COLOR PALETTE INFORMATION |
|---|---|---|---|---|
| (30° 16' N, 130° 25' E) ~ (30° 22' N, 130° 37' E) | FOREST | MARCH – MAY | TEXTURE A | COLOR G, COLOR H |
| | | JUNE – AUGUST | TEXTURE B | COLOR I, COLOR J |
| | | SEPTEMBER – NOVEMBER | TEXTURE C | COLOR K, COLOR L, COLOR M |
| | | ... | ... | ... |
| (35° 26' N, 140° 22' E) ~ (35° 33' N, 140° 27' E) | SANDY BEACH | MARCH – MAY | TEXTURE D | COLOR N, COLOR O |
| | | JUNE – AUGUST | TEXTURE D | COLOR N, COLOR P, COLOR R |
| | | SEPTEMBER – NOVEMBER | TEXTURE D | COLOR N, COLOR Q |
| ... | ... | ... | ... | ... |
| (35° 14' N, 139° 8' E) ~ (35° 15' N, 139° 9' E) | CASTLE TOWN | 6:00~10:00 | TEXTURE E | COLOR S, COLOR T, COLOR U |
| | | 20:00~24:00 | TEXTURE F | COLOR V, COLOR W |
| ... | ... | ... | ... | ... |

FIG. 10

ALBUM CREATING APPARATUS, ALBUM CREATING METHOD, AND ALBUM CREATING PROGRAM

CROSS REFERENCE TO THE RELATED APPLICATION

This patent application claims priority from a Japanese Patent Application No. 2005-142975 filed on May 16, 2005, the contents of which are incorporated herein by reference.

BACKGROUND OF THE INVENTION

1. Field of the Invention

The present invention relates to an album creating apparatus, an album creating method, and an album creating program. More particularly, the present invention relates to an album creating apparatus, an album creating method, and an album creating program for adding a color suitable for a captured image to a portion except the captured image in an album.

2. Description of Related Art

Conventionally, a method for selecting a desired template from templates made by changing a previously stored design in incremental steps to insert a captured image into the desired template is proposed as disclosed, for example, in Japanese Patent Application Publication No. 2002-049924. Moreover, a method for previously storing a template and an image processing method corresponding to the template to perform the image processing on a captured image when inserting the captured image into the template is proposed as disclosed, for example, in Japanese Patent Application Publication No. 2002-051206.

However, in the invention described in Japanese Patent Application Publication No. 2002-049924, since only the template previously stored can be used to create an album, it is not possible to automatically create an album in which a color scheme suitable for a captured image is performed on a portion except the captured image. Moreover, in the invention described in Japanese Patent Application Publication No. 2002-051206, since the contents of image processing are previously determined for each template, it is not possible to perform an image processing based on a place in which a captured image is taken and automatically create an album in which a color scheme suitable for the place on which the captured image is taken is performed on a portion except the captured image.

SUMMARY OF THE INVENTION

Therefore, it is an object of the present invention to provide an album creating apparatus, an album creating method, and an album creating program that can solve the foregoing problems. The above and other objects can be achieved by combinations described in the independent claims. The dependent claims define further advantageous and exemplary combinations of the present invention.

To solve the above problem, according to the first aspect of the present invention, there is provided an album creating apparatus. The apparatus includes: a captured position specifying section that specifies a captured position at which a captured image constituting an album is taken; a color selecting section that selects a color to be used in a portion except the captured image in the album based on the captured position specified by said captured position specifying section; and a color adding section that uses the color selected by said color selecting section to add color to the portion except the captured image in the album.

Moreover, the album creating apparatus may further include: an image storing section that stores each of a plurality of captured images in association with each captured position; an image classifying section that classifies the plurality of captured images stored on said image storing section into a plurality of captured image groups based on each captured position; and an image arranging section that respectively arranges the plurality of captured image groups classified by said image classifying section in a plurality of arrangement areas in the album, the captured position specifying section may specify a captured region in which a plurality of captured images included in the captured image group classified by said image classifying section are taken; the color selecting section may respectively select colors to be used in the plurality of arrangement areas in the album based on the captured region specified by said captured position specifying section, and the color adding section may use the colors selected by said color selecting section to respectively add color to portions except the captured image in the plurality of arrangement areas in the album.

Further, the image arranging section may respectively arrange the plurality of captured image groups classified by said image classifying section in a plurality of pages in the album, the color selecting section may select colors to be used in the plurality of pages in the album based on the captured region specified by said captured position specifying section, and the color adding section may use the colors selected by said color selecting section to respectively add color to portions except the captured image in the plurality of pages in the album. Moreover, the album creating apparatus may further include a color palette information storing section that stores color palette information showing a combination of a predetermined plurality of colors in association with the captured position, the color selecting section may select a color palette stored on said color palette information storing section in association with the captured position specified by said captured position specifying section, and the color adding section may use a combination of a plurality of colors shown by the color palette selected by said color selecting section to add color to the portion except the captured image in the album.

Moreover, the color palette information storing section may store color palette information in association with a country, the captured position specifying section may specify a country in which the captured image constituting the album is taken, and the color selecting section may select a color palette stored on said color palette information storing section in association with the country specified by said captured position specifying section. Further, the album creating apparatus may further include a captured time specifying section that specifies a captured time at which the captured image constituting the album is taken, the color selecting section may select a color to be used in the portion except the captured image in the album based on the captured position specified by said captured position specifying section and the time including the captured time specified by said captured time specifying section, and the color adding section may use the color selected by said color selecting section to add color to the portion except the captured image in the album.

Further, the album creating apparatus may further include: a captured time specifying section that specifies a captured time at which the captured image constituting the album is taken; and a color palette information storing section that stores color palette information showing a combination of a plurality of predetermined colors in association with the captured position and the captured time, the color selecting section may select a color palette stored on said color palette information storing section in association with the captured position specified by said captured position specifying section and the time including the captured time specified by said captured time specifying section, and the color adding section may use the combination of the plurality of colors shown by the color palette selected by said color selecting section to add color to the portion except the captured image in the album. Moreover, the album creating apparatus may further include; a texture selecting section that selects a texture to be used in the portion except the captured image in the album based on the captured position specified by said captured position specifying section; and a texture adding section that uses the texture selected by said texture selecting section to add texture to the portion except the captured image in the album, and the color adding section may use the color selected by said color selecting section to add color to the texture added to the portion except the captured image in the album by said texture adding section.

Moreover, according to the second aspect of the present invention, there is provided an album creating method. The method includes: a captured position specifying step of specifying a captured position at which a captured image constituting an album is taken; a color selecting step of selecting a color to be used in a portion except the captured image in the album based on the captured position specified in said captured position specifying step; and a color adding step of using the color selected in said color selecting step to add color to the portion except the captured image in the album.

Moreover, according to the third aspect of the present invention, there is provided an album creating program for an album creating apparatus that creates an album. The album creating program makes the album creating apparatus function as: a captured position specifies section that specifies a captured position at which a captured image constituting an album is taken; a color selecting section that selects a color to be used in a portion except the captured image in the album based on the captured position specified by said captured position specifying section; and a color adding section that uses the color selected by said color selecting section to add color to the portion except the captured image in the album.

Moreover, according to the fourth aspect of the present invention, there is provided an album creating apparatus. The apparatus includes: a captured position specifying section that specifies a captured position at which a captured image constituting an album is taken; a texture selecting section that selects a texture to be used in a portion except the captured image in the album based on the captured position specified by said captured position specifying section; and a texture adding section that uses the texture selected by said texture selecting section to add texture to the portion except the captured image in the album.

Moreover, the album creating apparatus may further include: an image storing section that stores each of a plurality of captured images in association with each captured position; an image classifying section that classifies the plurality of captured images stored on said image storing section into a plurality of captured image groups based on each captured position; and an image arranging section that respectively arranges the plurality of captured image groups classified by said image classifying section in a plurality of arrangement areas in the album, the captured position specifying section may specify a captured region in which a plurality of captured images included in the captured image group classified by said image classifying section are taken, the texture selecting section may select a texture to be used in each of the plurality of arrangement areas in the album based on the captured region specified by said captured position specifying section, and the texture adding section may use the texture selected by said texture selecting section to add texture to the portion except the captured image in each of the plurality of arrangement areas in the album.

Further, the image arranging section may respectively arrange the plurality of captured image groups classified by said image classifying section in a plurality of pages in the album, the texture selecting section may select a texture to be used in each of the plurality of pages in the album based on the captured region specified by said captured position specifying section, and the texture adding section may use the texture selected by said texture selecting section to add texture to the portion except the captured image in each of the plurality of pages in the album. Moreover, the album creating apparatus may further include a texture information storing section that stores texture information showing a predetermined texture in association with the captured position, the texture selecting section may select a texture stored on said texture information storing section in association with the captured position specified by said captured position specifying section, and the texture adding section may use the texture selected by said texture selecting section to add texture to the portion except the captured image in the album.

Moreover, according to the fifth aspect of the present invention, there is provided an album creating method. The method includes: a captured position specifying step of specifying a captured position at which a captured image constituting an album is taken; a texture selecting step of selecting a texture to be used in a portion except the captured image in the album based on the captured position specified in said captured position specifying step; and a texture adding step of using the texture selected in said texture selecting step to add texture to the portion except the captured image in the album.

Further, according to the sixth aspect of the present invention, there is provided an album creating program for an album creating apparatus that creates an album. The album creating program makes the album creating apparatus function as: a captured position specifying section that specifies a captured position at which a captured image constituting an album is taken; a texture selecting section that selects a texture to be used in a portion except the captured image in the album based on the captured position specified by said captured position specifying section; and a texture adding section that uses the texture selected by said texture selecting section to add texture to the portion except the captured image in the album.

The summary of the invention does not necessarily describe all necessary features of the present invention. The present invention may also be a sub-combination of the features described above.

According to the present invention, it is possible to perform a color scheme suitable for a taken position on a portion except a captured image based on position information of the captured image.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 3 is a view showing data structure in an image storing section.

FIG. 4 is a view showing data structure in a color palette information storing section.

FIG. 8 is a view showing data structure in a texture information storing section.

FIG. 10 is a view showing data structure in a background information storing section.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
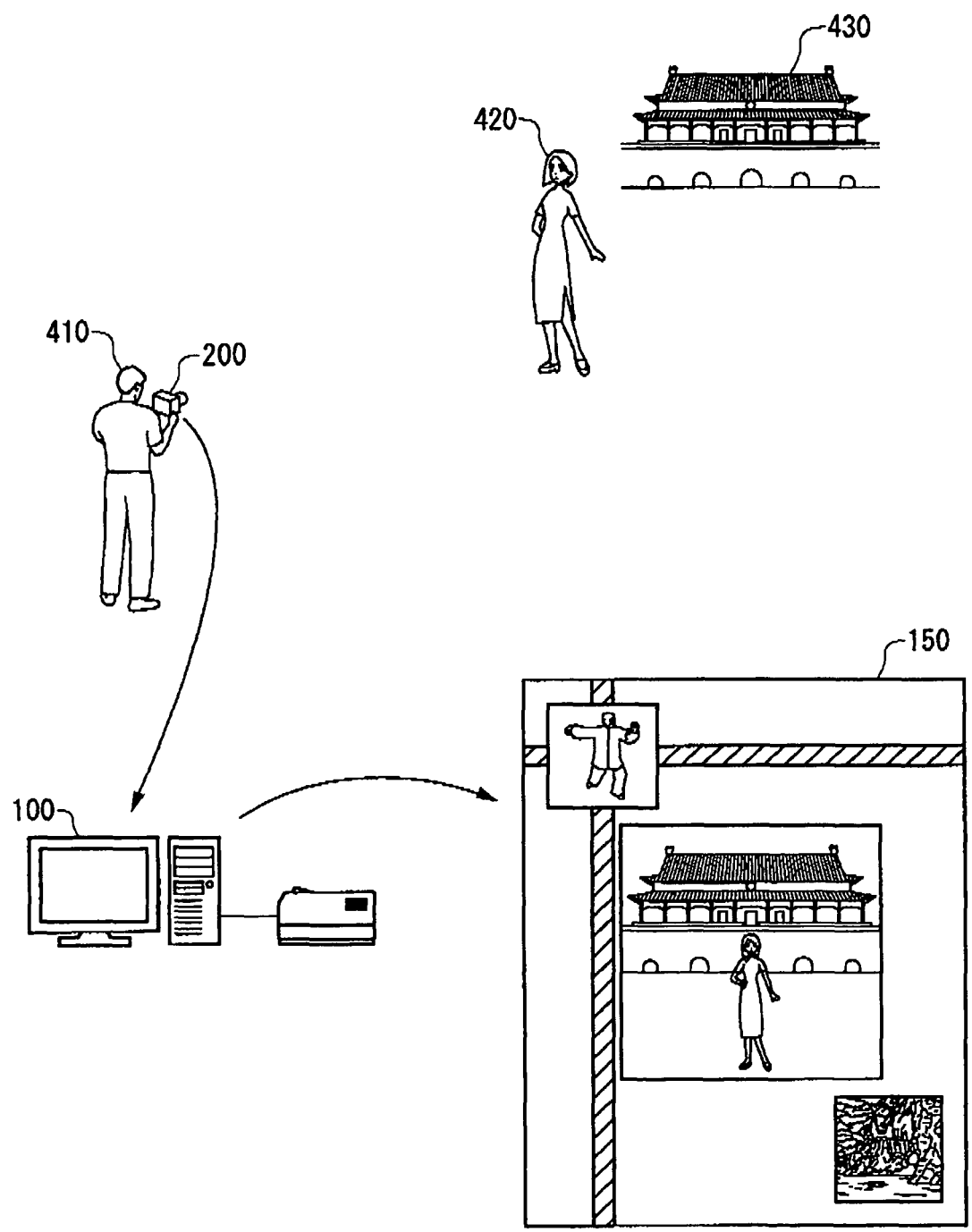
FIG. 1 is a conceptual diagram of an album creating apparatus.

FIG. 1 shows a scheme of an album creating apparatus 100 according to an embodiment of the present invention. An image capturing apparatus 200 records a captured image in association with a captured position. A captured position may be specified by, e.g., a GPS apparatus included in the image capturing apparatus 200. Then, the album creating apparatus 100 receives the captured image and the captured position from the image capturing apparatus 200. Subsequently, the album creating apparatus 100 selects a color on the basis of the captured position. Further, when the album creating apparatus 100 creates an album by means of captured images, the album creating apparatus 100 performs a color scheme on a portion except the captured image in an album by means of the color selected in association with the captured position. An object of the album creating apparatus 100 according to the present embodiment is to perform a color scheme suitable for a taken position on a portion except a captured image based on the position at which the captured image is taken.

Here, colors symbolizing a place, a region, a country, and so on are generally different from one another. For example, there is a color symbolizing the place like a color of a region, a color of a country, a color of a state, and a color of a national flag. When a person goes for a trip, a color remembered from a position or the like of a travel destination powerfully gives an impression on the person. Further, the person memorizes the remembered color. For example, when it is considered that a color symbolizing China and Taiwan is red, persons who have traveled to China and Taiwan memorize China and Taiwan and red in association with each other. Moreover, when it is considered that a color symbolizing Oceania is marine blue, persons who have traveled to the Oceania area memorize Oceania and marine blue in association with each other. Then, the album creating apparatus 100 uses a color symbolizing a captured position to add color to a portion except a captured image in an album. The album creating apparatus 100 may perform a pattern based on a color symbolizing a captured position on a page 150 in an album. In this way, a person can clearly remember an atmosphere of a place in a travel destination, a memory in a travel destination, or the like.

For example, it is considered that a user 410 takes a subject 420 and a subject 430 in China by means of the image capturing apparatus 200. Here, a color symbolizing China may be red. The image capturing apparatus 200 takes the subject 420 and the subject 430. Then, the image capturing apparatus 200 records a captured image and a captured position in association with each other. Subsequently, the captured image and the captured position recorded by the image capturing apparatus 200 are supplied to the album creating apparatus 100 via a memory or a network such as Internet.

Then, the album creating apparatus 100 specifies China, in which captured images constituting an album have been taken, as a captured position. Subsequently, the album creating apparatus 100 selects red that is a color symbolizing China. Then, the album creating apparatus 100 uses the selected red to add color to a portion except the captured image in the album. Then, the album creating apparatus 100 makes the page 150 in the album. Here, the album creating apparatus 100 may add color to the whole or the part of the portion except the captured image. Moreover, for example, the album creating apparatus 100 may arrange colors in a border of the captured image, or may draw a pattern on the portion except the captured image to perform a color scheme on the pattern. In this way, an appreciator of an album can clearly remember a memory and emotion in China that is a travel destination.

Figure 2:
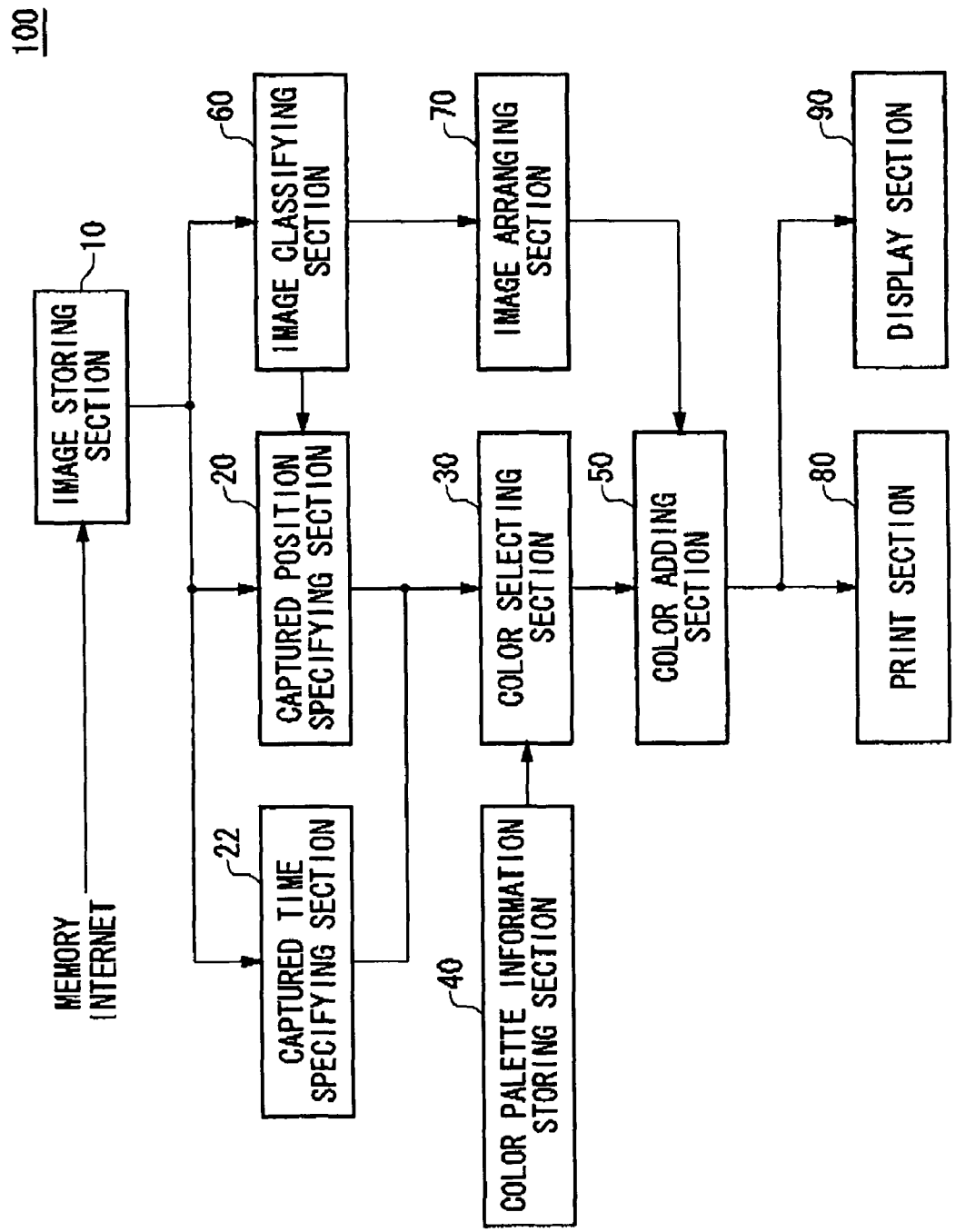
FIG. 2 is a block diagram showing a functional configuration of an album creating apparatus.

FIG. 2 is a view exemplary showing a functional configuration of the album creating apparatus 100 according to the present embodiment. The album creating apparatus 100 includes an image storing section 10, a captured position specifying section 20, a captured time specifying section 22, a color selecting section 30, a color palette information storing section 40, a color adding section 50, an image classifying section 60, an image arranging section 70, a print section 80, and a display section 90.

The image storing section 10 receives a captured image taken by the image capturing apparatus 200 and a captured position via a memory and a network such as Internet. Then, the image storing section 10 stores a plurality of captured images and captured positions corresponding to the plurality of captured images in association with an image identifier by which each captured image can be uniquely identified. In addition, when the image capturing apparatus 200 takes a captured image in association with captured date and time, the image storing section 10 may also store captured date and time in association with the image identifier. In addition, capturing date and time may include a captured time. The image storing section 10 supplies the captured position and the captured date and time stored in association with the image identifier to the captured position specifying section 20. Moreover, the image storing section 10 supplies the captured image, the captured position, and the captured date and time stored in association with the image identifier to the image classifying section 60. Furthermore, the image storing section 10 supplies the captured date and time stored in association with the image identifier to the captured time specifying section 22.

The image classifying section 60 classifies the plurality of captured images received from the image storing section 10 into a plurality of captured image groups based on the captured positions. In addition, a captured image group may be a group of a plurality of captured images having a predetermined special feature. A captured image group may be a group of a plurality of captured images taken in, e.g., a predetermined region, the same country, the same state, the predetermined time, or the like. For example, a captured image group may be a group of captured images taken in Europe, a group of captured images taken in China, or a group of captured images taken at a predetermined season such as spring. In addition, the predetermined time may be the time showing a predetermined time interval including a captured time.

Moreover, information showing a captured position may be information showing latitude and longitude of a taken position. Moreover, a captured position may be information showing a range of predetermined latitude and a range of predetermined longitude. For example, the image classifying section 60 may classify a plurality of captured images in association with latitude, longitude, or a range of latitude and longitude, every continent, every region, every country, every state, every city, or the like. That is, the image classifying section 60 may section a region in a net-like shape by means of longitude and latitude of a predetermined interval, in order to classify a plurality of captured images every section. The image classifying section 60 supplies the classified plurality of captured image groups to the captured position specifying section 20 and the image arranging section 70. In addition, the image classifying section 60 may classify a plurality of captured images into a plurality of captured image groups based on date and time at which the captured images are taken.

The captured position specifying section 20 specifies a captured position of a captured image constituting an album from information showing the captured position received from the image storing section 10. For example, when a captured position is expressed with latitude and longitude, the captured position may be specified from latitude and longitude. Moreover, the captured position specifying section 20 may specify a captured region or a country from latitude and longitude. Here, a captured region may be a region showing Europe, north and south Africa, Middle East, Southeast Asia, North and South America, Oceania, or the like. Moreover, the captured position specifying section 20 may specify a captured region of a plurality of captured images included in the classified plurality of captured image groups received from the image classifying section 60. The captured position specifying section 20 supplies the specified captured position to the color selecting section 30. The captured time specifying section 22 specifies a captured time, at which a captured image constituting an album is taken, from the captured date and time received from the image storing section 10. The captured time specifying section 22 supplies the specified captured time to the color selecting section 30.

The color palette information storing section 40 stores color palette information showing a combination of a predetermined plurality of colors in association with a captured position. For example, the color palette information storing section 40 may store color palette information based on at least one of a captured place, captured date and time, and season information. Here, a color palette may be a combination of a plurality of colors that visually brings a balance. In addition, the color palette information storing section 40 may include a color palette opened on Internet or the like, or may include a color palette recorded in a recording medium such as a semiconductor memory. For example, when a captured place is Japan, the color palette information storing section 40 may store, as color palette information, cerise when the captured season of captured image is spring, primitive colors when the captured season of captured image is summer, autumn color when the captured season of captured image is autumn, and white when the captured season of captured image is winter. In addition, about other countries except Japan, the color palette information storing section 40 stores color palette information symbolizing the country. The color palette information storing section 40 supplies the color palette information to the color selecting section 30.

The color selecting section 30 selects a color to be used in a portion except the captured image in the album based on the captured position specified by the captured position specifying section 20. Moreover, the color selecting section 30 respectively selects colors to be used in a plurality of arrangement areas included in the album based on the captured time specified by the captured time specifying section 22. For example, the color selecting section 30 selects a combination of a plurality of colors from color palette information associated with a captured region, captured date and time, season information, or the like. Furthermore, the color selecting section 30 may respectively select colors to be used in a plurality of pages included in the album based on the captured region specified by the captured position specifying section 20. For example, when a captured image taken in a region different from one another is arranged for each page in the album, the color selecting section 30 may select a color to be arranged in a portion except the captured image every page based on the captured position.

Moreover, the color selecting section 30 selects a color palette corresponding to the captured position specified by the captured position specifying section 20 from the color palette information storing section 40. Then, the color selecting section 30 receives the selected color palette from the color palette information storing section 40. Moreover, the color selecting section 30 may select a color palette stored on the color palette information storing section 40 in association with the region and the country specified by the captured position specifying section 20. Moreover, the color selecting section 30 may select a color for a plurality of captured images based on date and time at which the captured images are taken. That is, the image classifying section 60 first classifies the plurality of captured images so that the captured images are included in a range of predetermined captured date and time. For example, the image classifying section 60 classifies the plurality of captured images so that the captured images are included in a range of the predetermined time including the captured times such as every year, every season, or every month. Moreover, when, captured positions for the captured images are the same as one another or within a predetermined range, the image classifying section 60 may classify the plurality of captured images based on captured date and time. Then, the color selecting section 30 may select color corresponding to the plurality of captured images based on captured date and time.

For example, it is considered that a place specified by the captured position specifying section 20 is Japan. In this case, the color palette information storing section 40 stores a color palette evoking a season corresponding to the month in association with the position and the month. Then, the color selecting section 30 selects a color palette stored on the color palette information storing section 40 based on a season in which the captured image has been taken. For example, when the captured time of the captured image is December, the color selecting section 30 may select color palette information stored in association with December or winter. Color palette information stored in association with winter may be color palette information including, e.g., a color with low chroma saturation and brightness. The color selecting section 30 supplies the selected color to the color adding section 50.

The image arranging section 70 respectively arranges the classified plurality of captured image groups received from the image classifying section 60 in a plurality of arrangement areas in the album. In addition, an arrangement area may be an area for arranging a captured image within a page in the album. Moreover, the image arranging section 70 may respectively arrange a plurality of captured images included in the captured image group classified by the image classifying section 60 in a plurality of pages in the album. In addition, a page may be spread pages in the album or may be one of spread pages in the album. Moreover, when the album creating apparatus 100 is an apparatus that outputs captured images as an album on a display device such as a display, a page may be a display area in which a plurality of images is simultaneously displayed on a display device. The image arranging section 70 supplies information related to the album, in which captured images have been arranged, to the color adding section 50.

The color adding section 50 uses the color selected by the color selecting section 30 to add color to a portion except the captured image in the album, which is received from the image arranging section 70. Moreover, the color adding section 50 may use the color selected by the color selecting section 30 to add color to a portion except the captured image in each of the plurality of arrangement areas included in the album. For example, when a page in the album has a plurality of arrangement areas for arranging a captured image, the color adding section 50 can perform a color scheme on a portion except an area for arranging each captured image by means of the selected color. Moreover, by means of a color selected by the color selecting section 30 based on at least one of the captured position, the captured date and time, and the season information, the color adding section 50 may add the selected color to a background in the album.

Furthermore, the color adding section 50 may use the color selected by the color selecting section 30 to add color to a portion except the captured image in each of the plurality of pages included in the album. For example, when the plurality of captured images classified by the image classifying section 60 is arranged every page, the color adding section 50 may use a color associated with the captured image group selected by the color selecting section 30 to perform a color scheme on a portion except the captured image in the page included in the album.

Moreover, the color adding section 50 may arrange various patterns (for example, a band pattern, a ribbon pattern, a waterdrop pattern, etc.) based on the color selected by the color selecting section 30 in a portion except the captured image in the album. Moreover, the color adding section 50 may perform a color scheme based on the color selected by the color selecting section 30 on the border of the captured image. Furthermore, a color scheme may be performed on a portion except the captured image in the album by gradation by means of the color selected by the color selecting section 30.

Then, the color adding section 50 may use a combination of a plurality of colors shown by the selected color palette to add color to a portion except the captured image in the album when the color selecting section 30 selects the color palette on the basis of the captured position. Furthermore, when the color selecting section 30 selects a color palette associated with the country specified by the captured position specifying section 20, the color adding section 50 may use a combination of a plurality of colors shown by the selected color palette to add color to a portion except the captured image in the album. The color adding section 50 supplies the album on which a color scheme is performed to the print section 80 and the display section 90.

The print section 80 prints the album in which a color scheme is performed on the portion except the captured image and that is received from the color adding section 50. Moreover, the display section 90 displays the album, in which a color scheme is performed on the portion except the captured image and which is received from the color adding section 50, on a display device such as a display. That is, the display section 90 may display the album received from the color adding section 50 on a display device as an electronic album.

According to the album creating apparatus 100 of the present embodiment, it is possible to automatically perform a color scheme on a portion except a captured image in an album based on a captured position. In this way, an appreciator of an album can clearly remember a trip or the like because a region in which captured images are taken can be easily remembered.

FIG. 3 is a view exemplary showing the image storing section 10 according to the present embodiment. The image storing section 10 respectively stores a plurality of captured images in association with captured positions. A captured position may be information showing latitude and longitude corresponding to a position at which the captured image is taken. Moreover, captured positions and image data for captured images may be stored in association with image identifiers. Here, an image identifier may be a value uniquely determined about each image when the image storing section 10 stores images. In addition, an image identifier may be a character string such as a file name assigned to a file showing image data in addition to a numeric value. Moreover, the image storing section 10 may further store information showing date and time at which the image has been taken, in association with an image identifier identifying each of the plurality of images.

FIG. 4 is a view exemplary showing the color palette information storing section 40 according to the present embodiment. The color palette information storing section 40 stores color palette information showing a combination of a predetermined plurality of colors in association with a captured position. For example, in association with a position, a region, a country, a national flag, and so on, the color palette information storing section 40 stores colors of the position, the region, the country, the national flag, and so on. For example, when the captured position specifying section 20 has specified the taken country based on the taken position, color palette information corresponding to the country selected by the color selecting section 30 is supplied from the color palette information storing section 40 to the color selecting section 30. Then, the color adding section 50 uses the color selected by the color selecting section 30 for a color scheme for a portion except the captured image.

For example, when a specified country is China, the color selecting section 30 is supplied with color palette information including color A, color B, and color C from the color palette information storing section 40. Moreover, when a specified state is England, the color selecting section 30 is supplied with color palette information including color D, color E, and color F from the color palette information storing section 40. In addition, the color palette information storing section 40 may store color palette information based on a region such as Europe, Southeast Asia, or Oceania. Moreover, the color palette information storing section 40 may store color palette information in association with every continent, every state, every prefecture, or the like. Furthermore, the color palette information storing section 40 may store color palette information in association with the time such as every season, every month, or every time.

Specifically, the color palette information storing section 40 may store color palette information in association with a captured position and captured date and time. For example, the color palette information storing section 40 may store color palette information of the predetermined time in association with Japan as a captured position. More specifically, the color palette information storing section 40 stores characteristic color palette information about each of spring (March to May), summer (June to August), autumn (September to November), and winter (December to February) in association with Japan. For example, when a captured position is Japan, the color palette information storing section 40 may store color palette information based on cerise in association with spring, blue in association, with summer, autumn color in association with autumn, and white in association with winter. Moreover, when a captured position is Egypt, the color palette information storing section 40 may store color palette information based on yellow or yellow ocher regardless of captured date and time. Furthermore, when a captured position is the sea, the color palette information storing section 40 may store color palette information based on blue regardless of captured date and time.

According to the album creating apparatus 100 of the present embodiment, the color palette information storing section 40 can store color palette information obtained by combining a plurality of colors associated with a captured position and a captured time. In this way, it is possible to use an appropriate color evoking a captured position and a captured time to automatically perform a color scheme on a portion except a captured image in an album.

Figure 5:
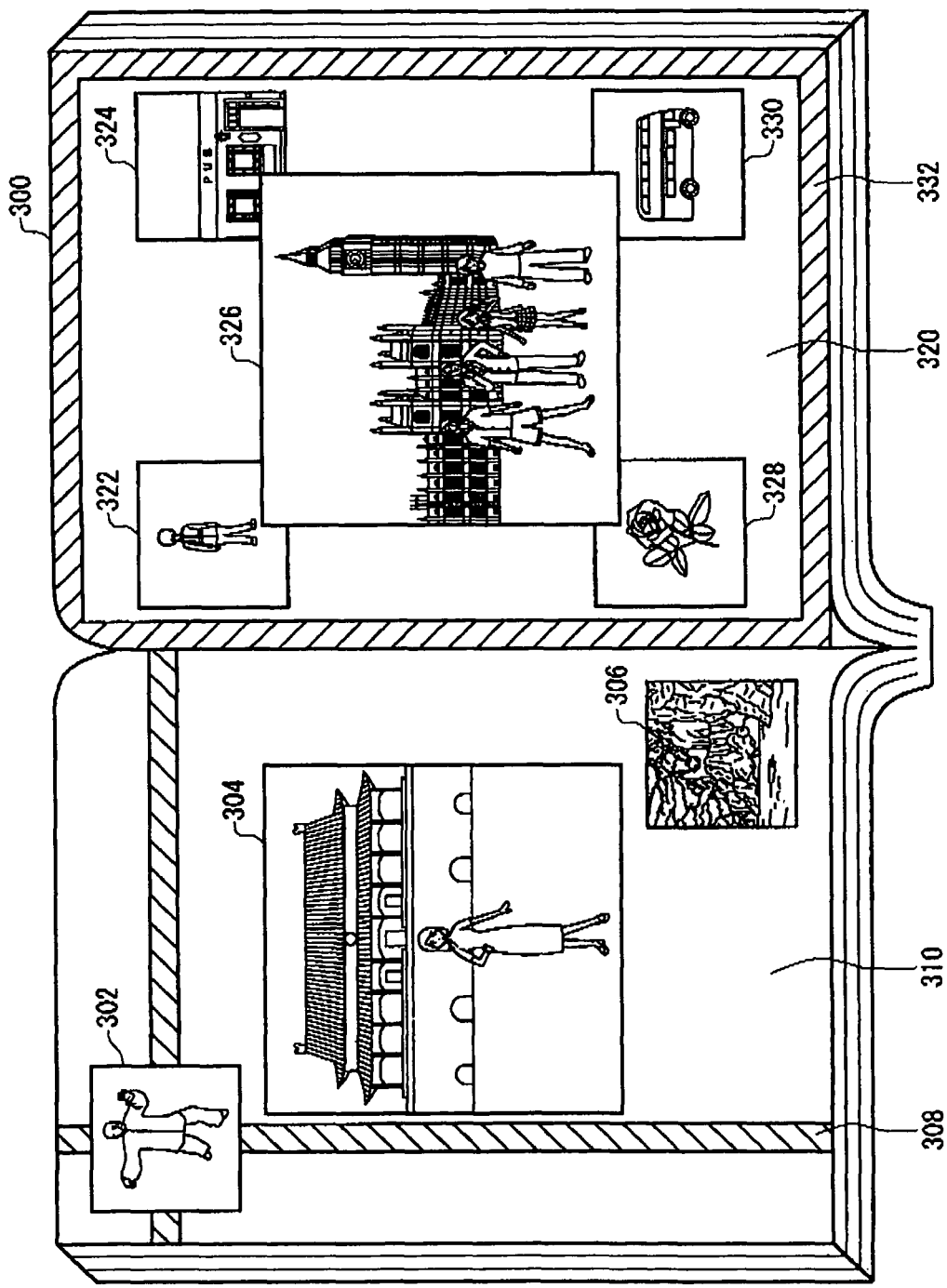
FIG. 5 is a view showing an image layout by an image arranging section.

FIG. 5 is a view exemplary showing an image layout by the image arranging section 70 according to the present embodiment. The image arranging section 70 arranges each of the plurality of captured image groups in the album, which is classified by the image classifying section 60. The image arranging section 70 arranges the captured image groups in a plurality of arrangement areas in the album. For example, the image arranging section 70 arranges the plurality of captured image groups, which is classified by the image classifying section 60 according to the same region or the same country, in the plurality of arrangement areas within the same page in the album. Moreover, the image arranging section 70 may arrange the plurality of captured image groups classified by the image classifying section 60 in the plurality of arrangement areas in a page included in the album.

Moreover, the image arranging section 70 may arrange the plurality of captured image groups in a plurality of pages in the album. The image arranging section 70 arranges the plurality of captured image groups classified by the image classifying section 60 in spread pages in the album. For example, the image arranging section 70 arranges captured images taken in the same region, the same country, or the like in spread pages in the album. Moreover, the image arranging section 70 may arrange captured images taken in regions or countries different from one another in each of spread pages in the album.

For example, in an album 300, it is considered that captured positions of a captured image 302, a captured image 304, and a captured image 306 are China. First, the album creating apparatus 100 arranges these captured images in arrangement areas within a page 310 in the album. Then, the album creating apparatus 100 may perform a color scheme based on a color symbolizing China on areas except the captured images, like a color-added portion 308.

Moreover, in the album 300, it is considered that captured positions of a captured image 322, a captured image 324, a captured image 326, a captured image 328, and a captured image 330 are England. First, the album creating apparatus 100 arranges these images in arrangement areas within a page 320 in the album. Then, the album creating apparatus 100 may perform a color scheme based on a color symbolizing England on areas except the captured images, like a color-added portion 332.

In addition, a shape of a portion to which a color is added as areas except captured images may be, e.g., a border of a page of an album, a border of a captured image, a pattern of a band shape to be arranged in a background, a pattern of a circle, a pattern of a rectangle, or other patterns, or a combination of these patterns. Moreover, the plurality of colors selected by the album creating apparatus 100 may be added to these shapes or a background in the album. Furthermore, the album creating apparatus 100 may perform a color scheme on these shapes by a technique such as hatching or gradation by means of the plurality of selected colors.

Moreover, the color selecting section 30 may compare contrast of colors included in captured images with contrast of colors added to areas except the captured images. Then, the color adding section 50 may reduce the contrasts of colors added to areas except the captured images to be smaller than the contrast of colors included in the captured images, in order to perform a color scheme. In this way, since an appropriate color scheme on the basis of a captured position is performed on a portion except a captured image, it is possible to make the captured image easily viewable.

Figure 6:
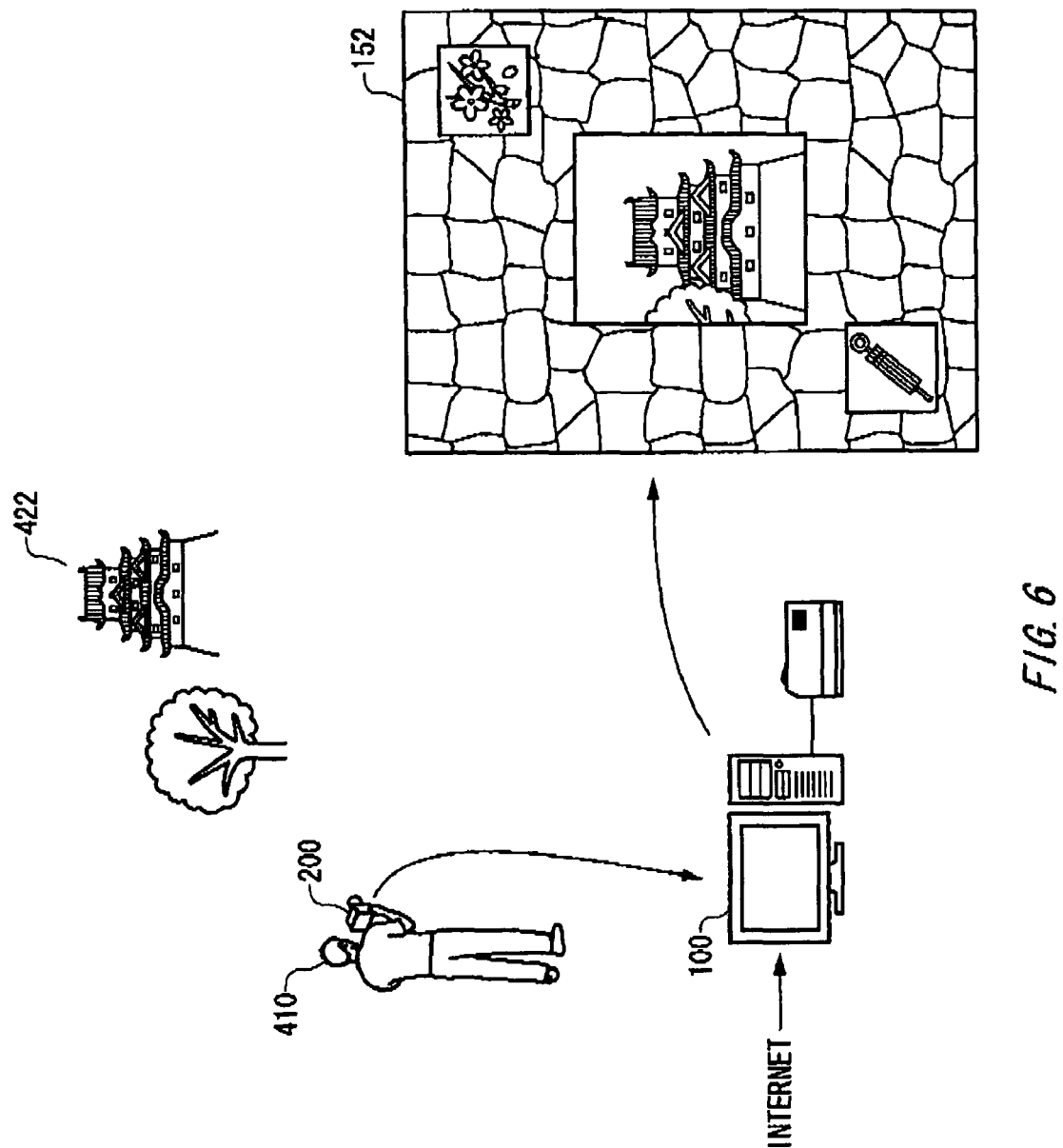
FIG. 6 is a schematic diagram of an album creating apparatus.

FIG. 6 is a schematic diagram exemplary showing an album creating apparatus 100 according to the second embodiment of the present invention. First, a user 410 takes a subject 422 by means of an image capturing apparatus 200. Then, the image capturing apparatus 200 records a captured image in association with a captured position. For example, a captured position may be specified by a GPS apparatus included in the image capturing apparatus 200. Then, the album creating apparatus 100 receives the captured image and the captured position from the image capturing apparatus 200. Subsequently, the album creating apparatus 100 selects a texture corresponding to the captured position. Then, when creating an album using the captured image, the album creating apparatus 100 uses the texture selected in association with the captured position to add texture to a portion except the captured image in the album, i.e., a background of the album. An object of the album creating apparatus 100 according to the present embodiment is to add a texture corresponding to a captured position to a background of an album.

For example, it is considered that a user 410 takes the subject 422 by means of the image capturing apparatus 200. A captured position of an image taken by the image capturing apparatus 200 is specified by the GPS apparatus included in the image capturing apparatus 200. Then, the image capturing apparatus 200 records the specified captured position (e.g., latitude and longitude of the captured position) in association with the captured image. Then, the captured image with which the captured position is associated is supplied from the image capturing apparatus 200 to the album creating apparatus 100. On the other hand, the album creating apparatus 100 previously has a texture associated with the captured position (e.g., information showing latitude and longitude). Then, when the album creating apparatus 100 has received the captured image, the album creating apparatus 100 extracts a texture associated with the captured position of the captured image. Subsequently, when the album creating apparatus 100 creates a page 152 of the album, the album creating apparatus 100 adds the extracted texture to a background of the page 152 of the album. For example, the album creating apparatus 100 adds a texture of a stone wall to the background of the page 152 of the album.

In addition, the album creating apparatus 100 may retrieve a satellite photograph of a place corresponding to the captured position from satellite photographs opened on a network such as Internet by means of the captured position received from the image capturing apparatus 200. Then, the album creating apparatus 100 acquires a satellite photograph of a place corresponding to the captured position. Subsequently, the album creating apparatus 100 analyzes the acquired satellite photograph to estimate a state of land of the captured position. Then, the album creating apparatus 100 may add a texture or a color to the background of the album based on the estimated result. For example, when the captured position is a forest from the result obtained by analyzing the satellite photograph, the album creating apparatus 100 adds a texture of a forest or a color of a forest to the background of the album. Moreover, when the captured position is savanna from the result obtained by analyzing the satellite photograph, the album creating apparatus 100 adds a texture of savanna or a color characteristic of savanna to the background of the album.

According to the album creating apparatus 100 of the present embodiment, since a texture characteristic of a captured position can be added to a background of an album, an album appreciator can remember at first sight a place at which images arranged in the album have been taken when the appreciator looks at the album.

Figure 7:
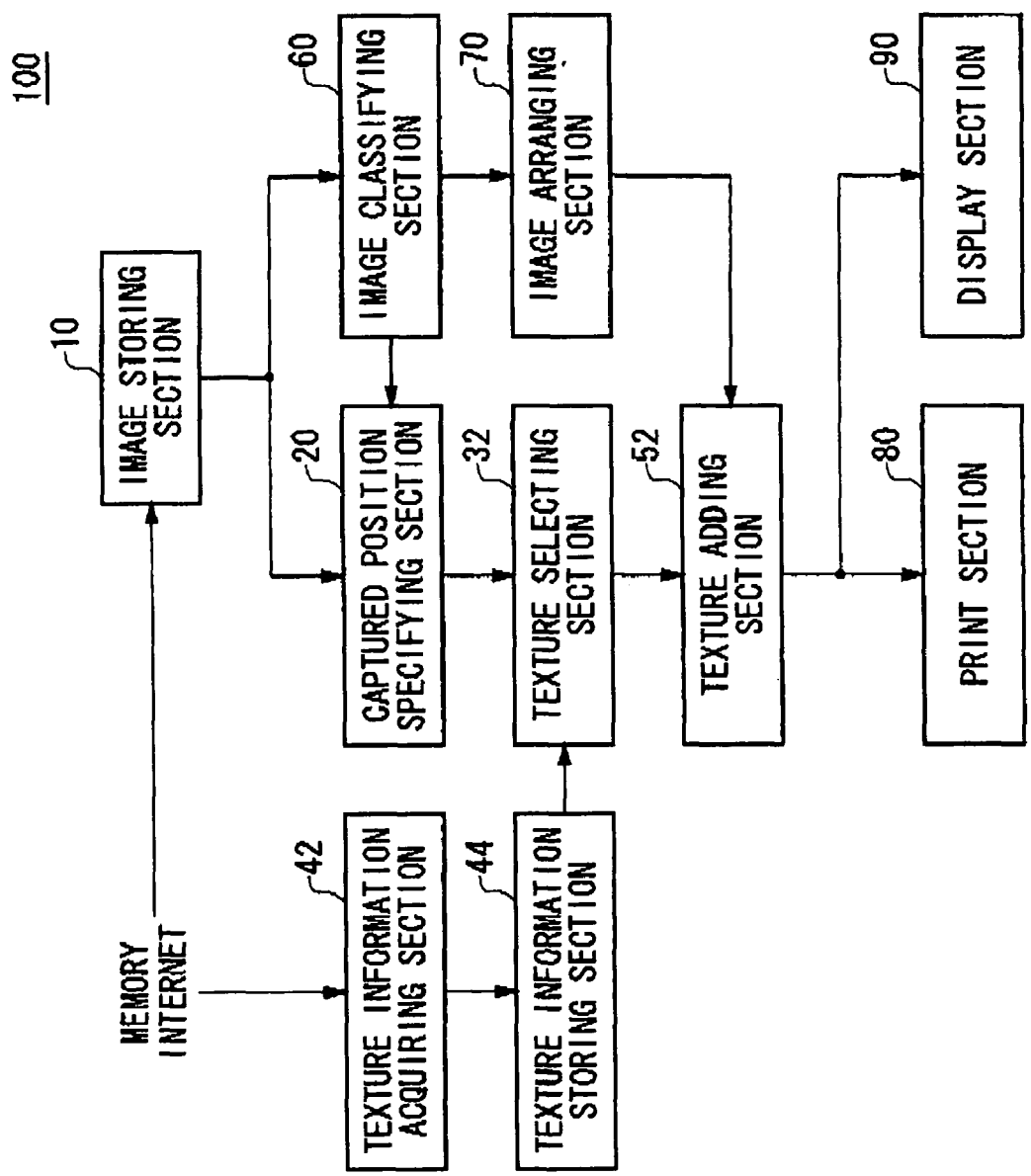
FIG. 7 is a block diagram showing a functional configuration of an album creating apparatus.

FIG. 7 is a view exemplary showing a functional configuration of the album creating apparatus 100 according to the present embodiment. The album creating apparatus 100 includes an image storing section 10, a captured position specifying section 20, a texture selecting section 32, a texture information acquiring section 42, a texture information storing section 44, a texture adding section 52, an image classifying section 60, an image arranging section 70, a print section 80, and a display section 90. Here, the album creating apparatus 100 may further include a part or the whole of functions or configurations of the album creating apparatus 100 as described above with reference to FIGS. 1 to 5. In addition, since the same members as those described above with reference to FIGS. 1 to 5 have the generally same function, their descriptions will be omitted.

The image storing section 10 stores a plurality of captured images taken by the image capturing apparatus 200 and captured positions of the plurality of captured images in association with an image identifier by which each of the captured images can be uniquely identified. The image storing section 10 supplies the captured position stored in association with the image identifier to the captured position specifying section 20. Moreover, the image storing section 10 supplies the captured image and the captured position stored in association with the image identifier to the image classifying section 60. The image classifying section 60 classifies the plurality of captured images received from the image storing section 10 into a plurality of captured image groups based on the captured positions. The image classifying section 60 supplies the classified plurality of captured image groups to the captured position specifying section 20 and the image arranging section 70. The captured position specifying section 20 specifies a captured position, a captured place, or a captured region of the captured image constituting the album from information showing a captured position received from the image storing section 10. The captured position specifying section 20 supplies the specified captured position or captured region to the texture selecting section 32.

The texture information storing section 44 stores texture information showing a predetermined texture in association with a captured position. For example, the texture information storing section 44 may store texture information based on at least one of a captured position and a captured time. The texture information storing section 44 supplies texture information to the texture selecting section 32 based on the control of the texture selecting section 32. The texture information acquiring section 42 acquires texture information opened on Internet, etc. Moreover, the texture information acquiring section 42 may acquire texture information from a recording medium such as a semiconductor memory. Then, the texture information acquiring section 42 stores the acquired texture information on the texture information storing section 44 in association with the captured position.

The texture selecting section 32 selects a texture to be used in a portion except the captured image in the album based on the captured position received from the captured position specifying section 20. Moreover, the texture selecting section 32 may select a texture based on the captured region specified by the captured position specifying section 20. Specifically, the texture selecting section 32 acquires the texture stored on the texture information storing section 44 in association with the captured position received from the captured position specifying section 20. Furthermore, the texture selecting section 32 may select a color to be used in each of a plurality of pages included in the album based on the captured region specified by the captured position specifying section 20. For example, when a captured image taken at a region different from one another is arranged for each page in the album, the texture selecting section 32 may select a texture to be arranged in a portion except the captured image every page based on the captured position. Moreover, the texture selecting section 32 may select a texture for the plurality of captured images based on date and time at which the captured images have been taken. The texture selecting section 32 supplies the selected texture to the texture adding section 52.

The image arranging section 70 respectively arranges the classified plurality of captured image groups received from the image classifying section 60 in a plurality of arrangement areas in the album. The image arranging section 70 supplies information on the album in which the captured images have been arranged to the texture adding section 52. The texture adding section 52 uses the texture selected by the texture selecting section 32 to add texture to a portion except the captured image in the album. Moreover, the texture adding section 52 may use the texture selected by the texture selecting section 32 to add texture to a portion except the captured image in each of the plurality of arrangement areas included in the album. For example, when a page of an album has a plurality of arrangement areas for arranging a captured image, the texture adding section 52 can add the selected texture to a portion except an area for arranging each captured image.

Furthermore, the texture adding section 52 may use the texture selected by the texture selecting section 32 to add texture to a portion except the captured image in each of the plurality of pages included in the album. For example, when the plurality of captured images classified by the image classifying section 60 is arranged every page, the texture adding section 52 may use a texture associated with the captured image group selected by the texture selecting section 32 to add texture to a portion except the captured image in a page included in the album. The texture adding section 52 supplies the album to which the texture is added to the print section 80 and the display section 90. The print section 80 prints the album in which the texture is added to the portion except the captured image and that is received from the texture adding section 52. Moreover, the display section 90 displays the album, in which the texture is added to the portion except the captured image and which is received from the texture adding section 52, on a display device such as a display.

Since the album creating apparatus 100 according to the present embodiment has a texture characteristic of a captured position in association with the captured position, it is possible to add a texture characteristic of the captured position to a portion except a captured image, e.g., a background portion in the album page, when the album is created from the captured images. In this way, a user can remember at a glance the position at which a captured image has been taken when the user appreciated the album page to which a texture has been added.

FIG. 8 is a view exemplary showing data structure of the texture information storing section 44 according to the present embodiment. The texture information storing section 44 stores texture information showing a predetermined texture in association with a captured position. Here, a texture may be an image to be use in a background of an album, in which a predetermined pattern is repeated. Moreover, a texture may be an image to be used in a background of an album, by which a predetermined texture or feeling of material is felt, by repeating a predetermined pattern. Furthermore, a texture may be an image to be used in a background of an album, by which a certain place is evoked, by repeating a pattern characteristic of the place. A captured position stored on the texture information storing section 44 may be latitude and longitude information by which the captured position can be specified. Moreover, the texture information storing section 44 may store information showing a predetermined section as a captured position. For example, when a region is sectioned into a net-like shape, the captured position stored on the texture information storing section 44 may be information showing a plurality of latitude and longitude specifying the section. Moreover, texture information stored on the texture information storing section 44 may be a texture characteristic of a captured position closely relevant to the captured position.

For example, when a captured position is a forest, a texture A stored on the texture information storing section 44 in association with the captured position may be an image in which a pattern having a shape of tree is regularly repeated. Moreover, when a captured position is a sandy beach, a texture D stored on the texture information storing section 44 in association with the captured position may be an image in which a pattern having a shape of a sandy beach (e.g., a shape of a surface of a sandy beach on the beach) is regularly repeated. Moreover, when a captured position is a castle town, a texture E stored on the texture information storing section 44 in association with the captured position may be an image in which a pattern having a shape of a stone wall is regularly repeated. Furthermore, the texture information storing section 44 may store texture information in association with various types of places such as a village, a town, a town area, a city, a savanna, a plain, a grassy plain, a damp plain, a bamboo grove, the jungle, a plateau, a basin, a mountain range, wetlands, and the sea.

Figure 9:
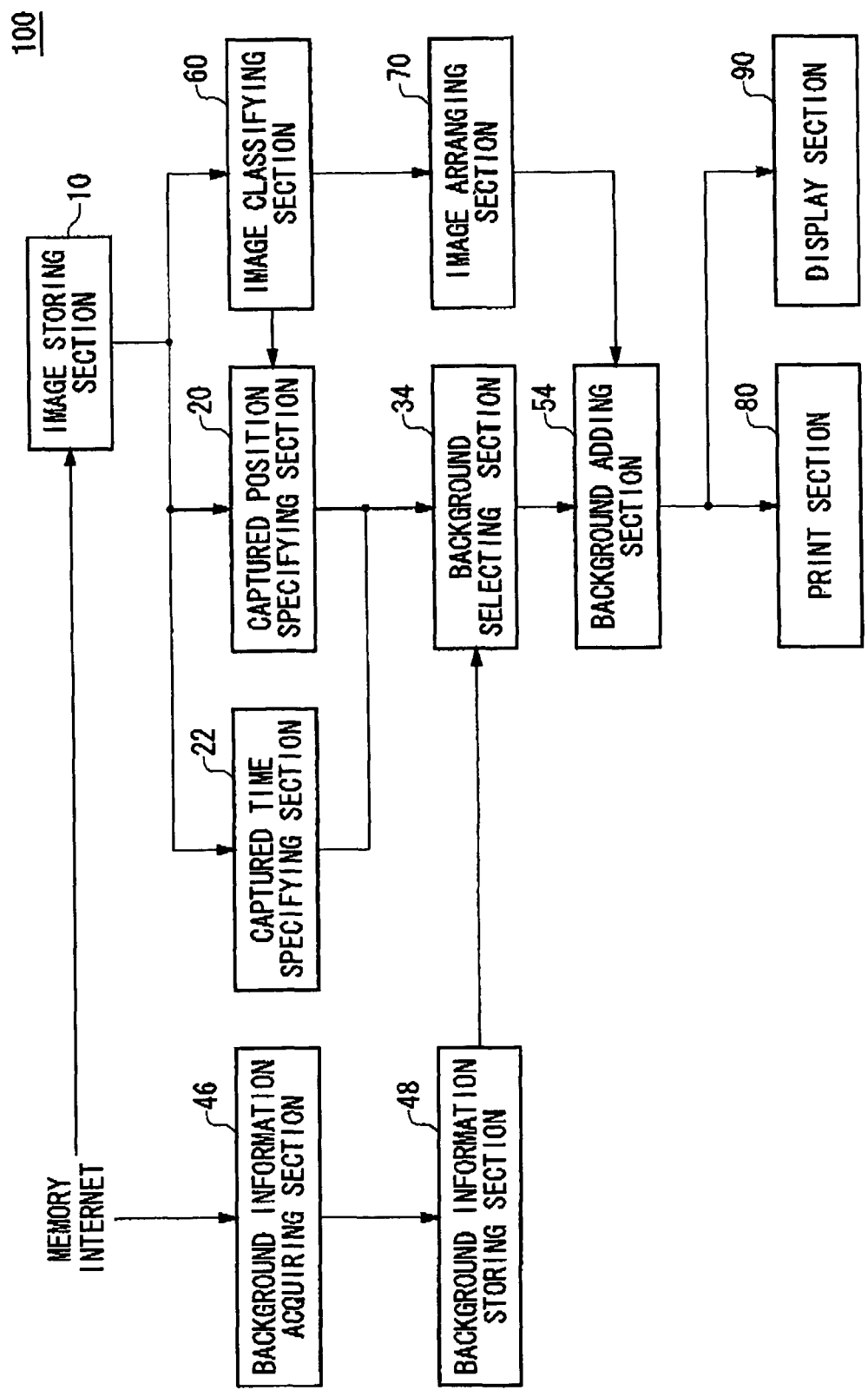
FIG. 9 is a block diagram showing a functional configuration of an album creating apparatus.

FIG. 9 is a view exemplary showing a functional configuration of an album creating apparatus 100 according to the third embodiment of the present invention. The album creating apparatus 100 includes an image storing section 10, a captured position specifying section 20, a captured time specifying section 22, a background selecting section 34, a background information acquiring section 46, a background information storing section 48, a background adding section 54, an image classifying section 60, an image arranging section 70, a print section 80, and a display section 90. Here, the album creating apparatus 100 may further include a part or the whole of functions or configurations of the album creating apparatus 100 described above with reference to FIGS. 1 to 8. In addition, since the same members as those described above with reference to FIGS. 1 to 8 have the generally same function, their descriptions will be omitted.

The image storing section 10 stores a plurality of captured images, captured positions of the plurality of captured images, and captured times of the plurality of captured images, in association with image identifiers. The image storing section 10 supplies the captured positions stored in association with the image identifiers to the captured position specifying section 20. Moreover, the image storing section 10 supplies the captured images, the captured times, and the captured positions stored in association with the image identifiers to the image classifying section 60. Furthermore, the image storing section 10 supplies the captured times stored in association with the image identifiers to the captured time specifying section 22. The image classifying section 60 classifies the plurality of captured images received from the image storing section 10 into a plurality of captured image groups based on the captured positions and the captured times. The image classifying section 60 supplies the classified plurality of captured image groups to the captured position specifying section 20 and the image arranging section 70. The captured position specifying section 20 specifies a captured position or a captured region of a captured image constituting an album from information showing the captured position received from the image storing section 10. The captured position specifying section 20 supplies the specified captured position or captured region to the background selecting section 34.

The background information storing section 48 stores texture information and color palette information in association with a captured position and the captured time including a captured time. In addition, the background information storing section 48 may have both functions of the color palette information storing section 40 and the texture information storing section 44. The background information storing section 48 supplies background information to the background selecting section 34 based on the control of the background selecting section 34. The background information acquiring section 46 acquires texture information and color palette information opened on Internet. Moreover, the background information acquiring section 46 may acquire texture information and color palette information from a recording medium such as a semiconductor memory. Then, the background information acquiring section 46 stores the acquired texture information and color palette information on the background information storing section 48 in association with the captured position.

Moreover, the background information acquiring section 46 may use information showing the captured position stored on the image storing section in association with the captured image to acquire a satellite photograph opened on Internet. Then, the background information acquiring section 46 may acquire color information or texture information characteristic of the captured position from the acquired satellite photograph. For example, when a captured position is the sea, the background information acquiring section 46 extracts blue included in the captured image to acquire the extracted blue as color information. Moreover, when a captured position is a forest, the background information acquiring section 46 may extract a color of a forest included in the captured image to acquire the extracted color as color information.

The background selecting section 34 selects a texture and a color or a texture and a color palette to be used in a portion except the captured image in the album, based on the captured position received from the captured position specifying section 20 and the captured time received from the captured time specifying section 22. Specifically, the background selecting section 34 selects a texture and a color or a texture and a color palette based on the captured region specified by the captured position specifying section 20. Moreover, the background selecting section 34 may select a texture, a color, or a color palette based on the captured time received from the captured time specifying section 22. In addition, the background selecting section 34 may have the functions of the color selecting section 30 and the texture selecting section 32 described above with reference to FIGS. 1 to 8. The background selecting section 34 supplies the selected texture, color, and color palette to the background adding section 54.

The image arranging section 70 respectively arranges the classified plurality of captured image groups received from the image classifying section 60 in a plurality of arrangement areas in the album. Moreover, the image arranging section 70 may respectively arrange the plurality of captured images included in the captured image group classified by the image classifying section 60 in a plurality of pages in the album. The image arranging section 70 supplies information on the album in which the captured images are arranged to the texture adding section 52. The background adding section 54 uses the texture, the color, and the color palette selected by the background selecting section 34 to add texture and color to a portion except the captured image in the album. Moreover, the background adding section 54 may use the texture, the color, and the color palette selected by the background selecting section 34 to add texture and color to a portion except the captured image in each of the plurality of arrangement areas included in the album.

For example, when a page of the album has a plurality of arrangement areas for arranging the captured images, the background adding section 54 can add the selected texture and color to a portion except an area for arranging each captured image. In addition, the background adding section 54 may have the functions of the color adding section 50 and the texture adding section 52 described above with reference to FIGS. 1 to 8. That is, the background adding section 54 first adds the texture selected by the background selecting section 34 to a background of the album. Subsequently, the background adding section 54 may add the color selected by the background selecting section 34 to the texture already added to the background of the album. The background adding section 54 supplies the album in which the texture and the color are added to the print section 80 and the display section 90. The print section 80 prints the album in which the texture and the color are added to a portion except the captured image and that is received from the background adding section 54. Moreover, the display section 90 displays the album, in which the texture and the color are added to a portion except the captured image and which is received from the background adding section 54, on a display device such as a display.

According to the album creating apparatus 100 of the present embodiment, since a texture and a color characteristic of a captured position and a captured time are previously stored in association with the captured position and the captured time, it is possible to add a texture and a color associated with a place and the time, at which the captured image is taken, to a background of an album when the album is created by means of the captured image. In this way, a user who has appreciated the album can easily remember the place and the time at which the captured image has been taken.

FIG. 10 is a view exemplary showing data structure of the background information storing section 48 according to the present embodiment. The background information storing section 48 stores the type of place in association with a captured position. Then, the background information storing section 48 stores texture information and color palette information in association with a captured position and the captured time including a captured time. That is, the background information storing section 48 may have the functions of the color palette information storing section 40 described above with reference to FIG. 4 and the texture information storing section 44 described above with reference to FIG. 8. In addition, the captured time may be a predetermined time interval including a captured time. For example, the captured time may be a season, a day, and a predetermined time period.

Specifically, the background information storing section 48 may store a texture of a forest of the predetermined time in association with a captured position and the captured time when a forest exists at the captured position. For example, the background information storing section 48 may store, in association with a captured position and the captured time, a texture of a forest, color palette information of spring (e.g., cerise, bright green, or the like), color palette information of summer (e.g., green, yellow green, or the like), color palette information of autumn (e.g., red, yellow, autumn color, or the like), color palette information of winter (e.g., white or a color having low brightness and chroma saturation), and so on. Similarly, the background information storing section 48 may store texture information and color palette information characteristic of the place and the captured time in association with the type of place of captured position and the captured time.

Figure 11:
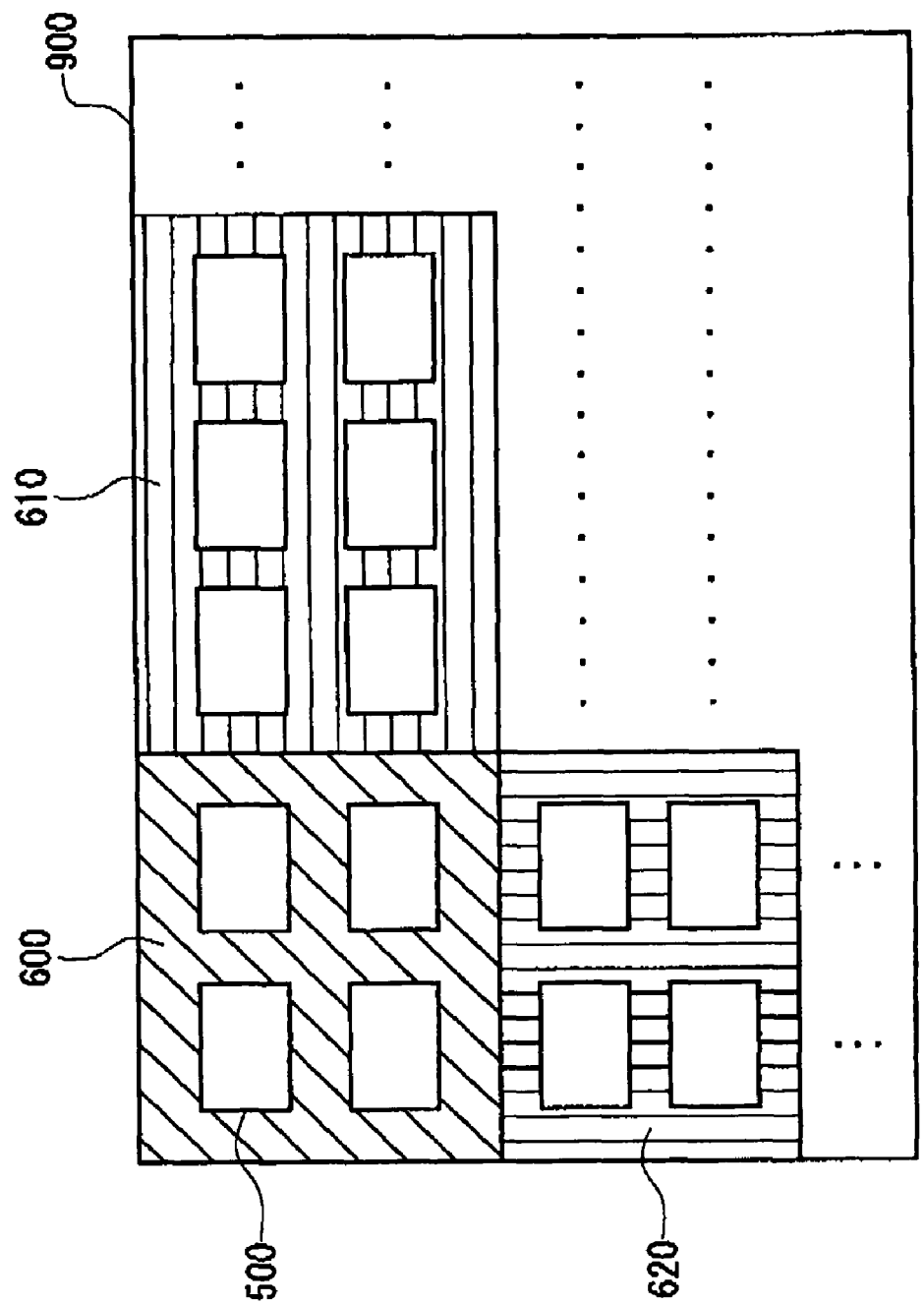
FIG. 11 is a view showing a display result by a display section.

FIG. 11 is a view exemplary showing a display result of the display section 90 according to the present embodiment. The image arranging section 70 may arrange the plurality of captured images classified by the image classifying section 60 in a display area on the display section 90 every captured region or captured time. Specifically, the image arranging section 70 arranges thumbnail images 500 for captured images in the display area on the display section 90 every captured region or captured time. Then, the background adding section 54 adds textures or colors corresponding to the captured regions or the captured times to areas except the thumbnail images 500 arranged in the display areas on the display section 90 by the image arranging section 70 every captured region or captured time.

For example, it is considered that the plurality of thumbnail images 500 is arranged in a display screen 900. In this case, the image arranging section 70 arranges the thumbnail images 500 classified every captured region in the display screen 900. Then, the background adding section 54 adds textures or colors corresponding to captured regions to areas except the thumbnail images 500 on the display screen 900. For example, the background adding section 54 adds textures or colors different from one another according to captured regions in which captured images corresponding to the thumbnail images 500 have been taken, like a background 600, a background 610, and a background 620.

According to the album creating apparatus 100 of the present embodiment, it is possible to add textures or colors characteristic of captured regions or the captured times to areas except the thumbnail images 500 when the plurality of thumbnail images 500 is displayed on the display screen 900. In this way, since a user can grasp at first sight regions or the like at which the plurality of thumbnail images 500 has been taken, the user can easily search for a desired image.

Figure 12:
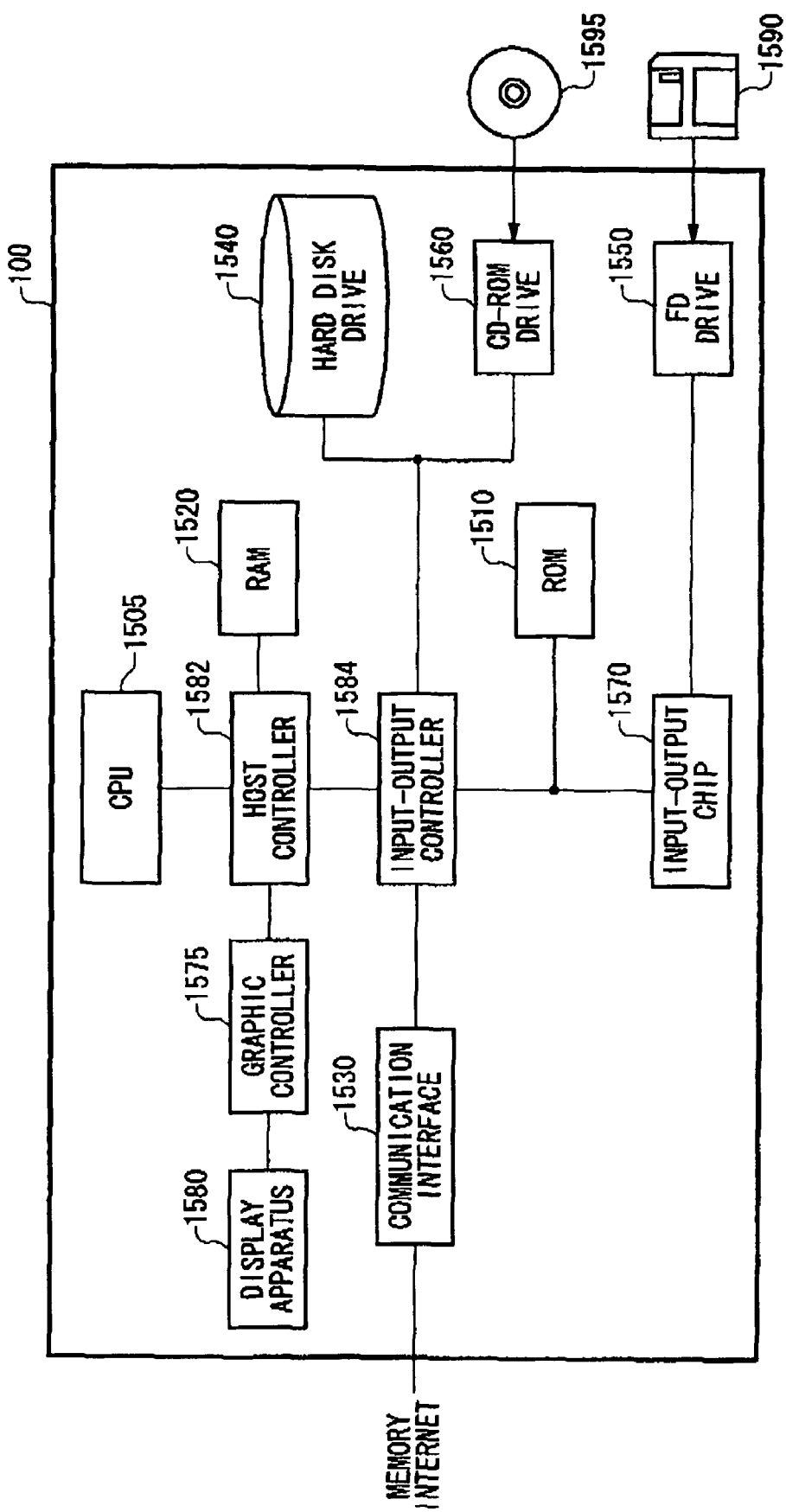
FIG. 12 is a block diagram showing a hardware configuration of an album creating apparatus.

FIG. 12 is a view exemplary showing a hardware configuration of the album creating apparatus 100 according to the present embodiment. The album creating apparatus 100 includes a CPU peripheral section having a CPU 1505, a RAM 1520, a graphic controller 1575, and a display apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the display apparatus 1580. Alternatively, the graphic controller 1575 may include therein the frame buffer storing the image data generated from the CPU 1505.

The input-output controller 1584 connects the host controller 1582 to the communication interface 1530, the hard disk drive 1540, and the CD-ROM drive 1560 that are a comparatively fast input-output apparatus. The communication interface 1530 communicates with another apparatus via a network or the like. The hard disk drive 1540 stores a program and data to be used by the CPU 1505 in the album creating apparatus 100. The CD-ROM drive 1560 reads a program or data from a CD-ROM 1595, and provides the program or data to the hard disk drive 1540 via the RAM 1520.

Moreover, the ROM 1510, the flexible disk drive 1550, and the input-output chip 1570 that are a comparatively low-speed input-output apparatus are connected to the input-output controller 1584. The ROM 1510 stores a boot program to be executed during starting the album creating apparatus 100, a program dependent on hardware of the album creating apparatus 100, or the like The flexible disk drive 1550 reads a program or data from a flexible disk 1590, and provides the program or data to the hard disk drive 1540 via the RAM 1520. The input-output chip 1570 connects the flexible disk drive 1550 to various kinds of input-output apparatuses via a parallel port, a serial port, a keyboard port, a mouse port, or the like.

An album creating program provided to the hard disk drive 1540 via the RAM 1520 is stored on a recording medium such as the flexible disk 1590, the CD-ROM 1595, or an IC card in order to be provided by a user. The album creating program is read from the recording medium, is installed in the hard disk drive 1540 in the album creating apparatus 100 via the RAM 1520, and is executed in the CPU 1505. The album creating program installed and executed in the album creating apparatus 100 works on the CPU 1505 or the like and makes the album creating apparatus 100 function as the image storing section 10, the captured position specifying section 20, the captured time specifying section 22, the color selecting section 30, the texture selecting section 32, the background selecting section 34, the color palette information storing section 40, the texture information acquiring section 42, the texture information storing section 44, the background information acquiring section 46, the background information storing section 48, the color adding section 50, the texture adding section 52, the background adding section 54, the image classifying section 60, the image arranging section 70, the print section 80, and the display section 90, which have been described with reference to FIGS. 1 to 11.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An album creating apparatus comprising:
    a captured position specifying section that specifies a captured position at which a captured image constituting an album is taken;
    a color selecting section that selects a color to be used in a portion except the captured image in the album based on the captured position specified by said captured position specifying section; and
    a color adding section that uses the color selected by said color selecting section to add color to the portion except the captured image in the album, wherein
    the album creating apparatus further comprises:
    an image storing section that stores each of a plurality of captured images in association with each captured position;
    an image classifying section that classifies the plurality of captured images stored on said image storing section into a plurality of captured image groups based on each captured position; and
    an image arranging section that respectively arranges the plurality of captured image groups classified by said image classifying section in a plurality of arrangement areas in the album,
    said captured position specifying section specifies a captured region in which a plurality of captured images included in the captured image group classified by said image classifying section are taken,
    said color selecting section respectively selects colors to be used in the plurality of arrangement areas in the album based on the captured region specified by said captured position specifying section, and
    said color adding section uses the colors selected by said color selecting section to respectively add color to portions except the captured image in the plurality of arrangement areas in the album.

2. The album creating apparatus as claimed in claim 1, wherein
    said image arranging section respectively arranges the plurality of captured image groups classified by said image classifying section in a plurality of pages in the album,
    said color selecting section selects colors to be used in the plurality of pages in the album based on the captured region specified by said captured position specifying section, and
    said color adding section uses the colors selected by said color selecting section to respectively add color to portions except the captured image in the plurality of pages in the album.

3. The album creating apparatus as claimed in claim 1, wherein
    the album creating apparatus further comprises a color palette information storing section that stores color palette information showing a combination of a predetermined plurality of colors in association with the captured position,
    said color selecting section selects a color palette stored on said color palette information storing section in association with the captured position specified by said captured position specifying section, and
    said color adding section uses a combination of a plurality of colors shown by the color palette selected by said color selecting section to add color to the portion except the captured image in the album.

4. The album creating apparatus as claimed in claim 3, wherein
said color palette information storing section stores color palette information in association with a country,
said captured position specifying section specifies a country in which the captured image constituting the album is taken, and
said color selecting section selects a color palette stored on said color palette information storing section in association with the country specified by said captured position specifying section.

5. The album creating apparatus as claimed in claim 1, wherein
the album creating apparatus further comprises a captured time specifying section that specifies a captured time at which the captured image constituting the album is taken,
said color selecting section selects a color to be used in the portion except the captured image in the album based on the captured position specified by said captured position specifying section and the time including the captured time specified by said captured time specifying section, and
said color adding section uses the color selected by said color selecting section to add color to the portion except the captured image in the album.

6. The album creating apparatus as claimed in claim 1, wherein
the album creating apparatus further comprises:
a captured time specifying section that specifies a captured time at which the captured image constituting the album is taken; and
a color palette information storing section that stores color palette information showing a combination of a plurality of predetermined colors in association with the captured position and the captured time,
said color selecting section selects a color palette stored on said color palette information storing section in association with the captured position specified by said captured position specifying section and the time including the captured time specified by said captured time specifying section, and
said color adding section uses the combination of the plurality of colors shown by the color palette selected by said color selecting section to add color to the portion except the captured image in the album.

7. The album creating apparatus as claimed in claim 1, wherein
the album creating apparatus further comprises:
a texture selecting section that selects a texture to be used in the portion except the captured image in the album based on the captured position specified by said captured position specifying section; and
a texture adding section that uses the texture selected by said texture selecting section to add texture to the portion except the captured image in the album, and
said color adding section uses the color selected by said color selecting section to add color to the texture added to the portion except the captured image in the album by said texture adding section.

8. An album creating method implemented via one or more processors, said method comprising:
a captured position specifying step of specifying a captured position at which a captured image constituting an album is taken;
a color selecting step of selecting a color to be used in a portion except the captured image in the album based on the captured position specified in said captured position specifying step; and
a color adding step of using the color selected in said color selecting step to add color to the portion except the captured image in the album, wherein
the album creating method further comprises:
an image storing section step which stores each of a plurality of captured images in association with each captured position;
an image classifying step, performed via the one or more processors, which classifies the plurality of captured images stored on said image storing section into a plurality of captured image groups based on each captured position; and
an image arranging step which respectively arranges the plurality of captured image groups classified by said image classifying section in a plurality of arrangement areas in the album,
said captured position specifying step specifies a captured region in which a plurality of captured images included in the captured image group classified by said image classifying step are taken,
said color selecting step respectively selects colors to be used in the plurality of arrangement areas in the album based on the captured region specified by said captured position specifying step, and
said color adding step uses the colors selected by said color selecting step to respectively add color to portions except the captured image in the plurality of arrangement areas in the album.

9. A computer readable medium encoded with an album creating program for an album creating apparatus that creates an album, the album creating program making the album creating apparatus function as:
a captured position specifying section that specifies a captured position at which a captured image constituting an album is taken;
a color selecting section that selects a color to be used in a portion except the captured image in the album based on the captured position specified by said captured position specifying section; and
a color adding section that uses the color selected by said color selecting section to add color to the portion except the captured image in the album, wherein
the album creating apparatus further comprises:
an image storing section that stores each of a plurality of captured images in association with each captured position;
an image classifying section that classifies the plurality of captured images stored on said image storing section into a plurality of captured image groups based on each captured position; and
an image arranging section that respectively arranges the plurality of captured image groups classified by said image classifying section in a plurality of arrangement areas in the album,
said captured position specifying section specifies a captured region in which a plurality of captured images included in the captured image group classified by said image classifying section are taken,
said color selecting section respectively selects colors to be used in the plurality of arrangement areas in the album based on the captured region specified by said captured position specifying section, and
said color adding section uses the colors selected by said color selecting section to respectively add color to portions except the captured image in the plurality of arrangement areas in the album.

* * * * *